United States Patent [19]

Thullen et al.

[11] Patent Number: 5,177,177

[45] Date of Patent: Jan. 5, 1993

[54] AMORPHOUS COPOLYAMIDE FROM DIMER ACID, AROMATIC DICARBOXYLIC ACID AND CYCLOALIPHATIC DIAMINE

[75] Inventors: Helmut Thullen; Eduard Schmid, both of Bonaduz, Switzerland

[73] Assignee: EMS-Inventa AG, Switzerland

[21] Appl. No.: 735,077

[22] Filed: Jul. 24, 1991

[30] Foreign Application Priority Data

Jul. 27, 1990 [DE] Fed. Rep. of Germany ....... 4023968

[51] Int. Cl.$^5$ .............................................. C08G 69/34
[52] U.S. Cl. ................... 528/339.3; 528/323; 528/324; 528/330; 528/331; 528/338; 528/339; 528/340; 528/346; 528/347

[58] Field of Search ...................... 528/339.3, 323, 324, 528/330, 331, 338, 339, 340, 346, 347

[56] References Cited

U.S. PATENT DOCUMENTS 4,791,169 12/1988 Drawert et al. ..................... 528/339

Primary Examiner—Harold D. Anderson
Attorney, Agent, or Firm—Jordan B. Bierman

[57] ABSTRACT

Rigid, amorphous copolyamides, which can be produced in a single-stage polycondensation reaction, having a high glass transition temperature and low water absorption capacity, consisting essentially of cycloaliphatic diamines, dimerized fatty acids, and aromatic dicarboxylic acids, and a method for the manufacture thereof.

14 Claims, No Drawings

AMORPHOUS COPOLYAMIDE FROM DIMER ACID, AROMATIC DICARBOXYLIC ACID AND CYCLOALIPHATIC DIAMINE

The invention relates to new copolyamides which are suitable for the production of shaped articles having a high glass transition temperature, rigidity, and impact resistance and low moisture absorption, a process for producing these copolyamides, and their use for the production of shaped articles.

BACKGROUND OF THE INVENTION

Thermoplastically processable polyamides can be divided into semicrystalline and amorphous homo- and copolyamides. The semicrystalline polyamides form an important group of commercial thermoplastics. Shaped articles produced from them are distinguished by high strength, rigidity, toughness and surface hardness, by good abrasion behaviour, and excellent resistance to chemicals and good stress crack resistance. However, the usefulness of these semicrystalline homo- and copolyamides (for example the high melting point homopolyamides PA 6 and PA 6, 6) is substantially reduced by their tendency to absorb water and the associated reduction of the glass transition temperature which causes a loss of rigidity and strength.

Rigid amorphous copolyamides are generally produced from aromatic dicarboxylic acids and diamines having a crystallization-inhibiting structure and can contain further comonomers such as amino acids, lactams, and salts of diamines and dicarboxylic acids. The properties of such copolyamides can be varied within wide limits by the choice of the monomers used in each case.

As already mentioned, the glass transition temperature drops due to moisture absorption, which in turn causes a reduction in the upper temperature at which it can be used. If rigid amorphous copolyamides are used, for example, in boiling water, a drop in a glass transition temperature (Tg) of up to about 100° C. is possible and this considerably restricts the usefulness of articles produced from these polymers because some of them completely lose their shape. Amorphous copoloyamides are described, for example, in the following patents: GB 619,707, CH 449,257, U.S. Pat. No. 2,494,563, U.S. Pat. No. 3,842,045, U.S. Pat. No. 3,840,501, JP 72/11,502, U.S. Pat. No. 2,969,482, U.S. Pat. No. 3,597,400, DE 21 59 803, and CH 624,970.

It is also known to use polymeric-in particular dimerized-fatty acids for the production of polyamides and copolyamides. These materials are used, for example, in adhesive and lubricant polymer chemistry. The structure and the properties of dimerized fatty acids are described in detail, for example in the Henkel-Emery/- Goud a(NL) brochure entitled "Empol Dimer and Polybasic Acids Technical Bulletin 114). These dimerized fatty acids are obtained from monomeric unsaturated fatty acids (usually containing 18 carbon atoms) by a specific polymerization reaction. There are many products having different ratios of monofunctional, difunctional, trifunctional, and polyfunctional acids. Types having a high dimer content (for example 90% and, in particular, 97%) are preferred for the production of thermoplastic polyamides.

Dimerized fatty acids can also be used in polyamides for surface coatings and adhesives (cf. U.S. Pat. No. 3,231,545). Alcohol-soluble additives for printing inks are described in BE 804,604 and GB 1,129,195. Copolyamides of diamines of the so-called dicycane type, i.e. 4,4'-diaminodicyclohexylmethane or derivatives thereof with dimerized fatty acid and a linear dicarboxylic acid containing 6 to 10 carbon atoms are described in U.S. Pat. No. 3,717,598. These products have a low glass transition temperature and a low modulus of elasticity are are therefore unsuitable for many technical applications.

In DE-A 1,720,832, there are described polyamides based on cycloaliphatic diamines (e.g. 3,3'-dimethyl-4,4'-diamino-dicyclohexylmethane), dimerized fatty acid which can be partially replaced by other aliphatic dicarboxylic acids, including cycloaliphatic or aromatic dicarboxylic acids, as well as additional monomers such as aminocarboxylic acids and lactams. The molar content of the dimerized fatty acid, based on the carboxylic groups, must be at least 25%. Examples in which aliphatic dicarboxylic acids are used are the only ones which are described specifically. These products are tough plastic materials having high tensile strength and elongation, and which are used as molding powder, adhesives, and in the form of the films or sheets.

Thermoplastically processible plastic materials which have high rigidity and strength and which maintain these properties under the influence of moisture, in particular in contact with boiling water, are required for many commercial applications. Preferably, the moisture absorption should be so low that the glass transition temperature is only slightly reduced.

DESCRIPTION OF THE INVENTION

The object of the invention is to provide rigid copolyamides with a high glass transition temperatures and with high strength, rigidity, and dimensional stability at elevated temperature, wherein the glass transition temperature is only slightly affected by moisture absorption.

The invention is based on the surprising discovery that amorphous copolyamides of
a) 50 mol % of at least one cycloaliphatic diamine corresponding to Formula I

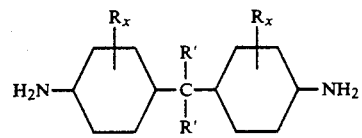

wherein R represents an alkyl radical containing from 1 to 10 carbon atoms, R' represents hydrogen or an alkyl radical containing 1 to 4 carbon atoms, and x is 0 to 4,
b) 5 to 25 mol % of a dimerized fatty acid,
c) 25 to 45 mol % of at least one aromatic dicarboxylic acid, and
d) 0 to 50% by weight, based on the total amount of a), b) and c)
exhibit low water absorption and therefore only a slight change in the glass transition temperature. Shaped articles produced therefrom have high strength, rigidity, and dimensional stability at elevated temperature, and these properties are maintained even if they are exposed to moisture at high temperatures, for example boiling water.

It is preferable to use cycloaliphatic diamines in which R in general Formula I represents an alkyl radical containing from 1 to 4 carbon atoms. Examples of cycloaliphatic diamines which can be used according to the invention include the dialkyl-4,4'diamino-dicyclohexylalkanes. It is particularly preferable to use 3,3'-dimethyl-4,4'-diaminodicyclohexylmethane (hereinafter called "Diamine") and 4,4'-diaminodicyclohexylalkanes such as 4,4'-diaminodicyclohexylmethane or propane.

A particularly suitable amorphous copolyamide consists of a) 50 mol % of at least one cycloaliphatic diamine corresponding to Formula I, wherein R represents an alkyl radical containing from 1 to 2 carbon atoms, R' represents hydrogen or alkyl radical containing from 1 to 4 carbon atoms and x is 1 or 2,
b) from 5 to 12 mol % of a dimerized fatty acid and
c) from 38 to 45 mol % of an aromatic dicarboxylic acid, wherein the molar sums add up to 100%.

Dimerized fatty acids b) which can be used in the amorphous copolymers of the invention include, in particular, those described in the above-mentioned Unilever or Henkel-Emery/Gouda (NL) company brochure, i.e. those which are derived from unsaturated fatty acids containing at least 18 carbon atoms. According to the invention, it is preferable to use dimerized fatty acids which have a dimer content of at least 90% by weight, and especially those of at least 97% by weight. Dimerized fatty acids which have been hydrogenated and distilled have a light inherent color and are preferred.

The aromatic dicarboxylic acids c) which are suitable for use in the amorphous copolyamides of the invention preferably include mononuclear or polynuclear, optionally substituted, aromatic dicarboxylic acids, e.g. isophthalic acid, terephthalic acid, naphthalenedicarboxylic acid, tert.-butylisophthalic acid, 1,1,3-trimethyl-3-phenylindan-4',5-dicarboxylic acid, and mixtures thereof. Isophthalic acid and terephthalic acid or a mixture of these acids which preferably contains at least 25 mol % of isophthalic acid are particularly preferred.

Polyamide-forming monomers d) useful to form the amorphous copolyamides of the invention include monomers which are conventional in polyamide production such as aliphatic dicarboxylic acids containing from 6 to 20 carbon atoms, aliphatic diamines containing from 2 to 20 carbon atoms, and/or aromatic/aliphatic diamines containing from 6 to 12 carbon atoms, for example, m-xylidenediamine or p-xylidenediamine. Amino acids and lactams containing from 4 to 14 carbon atoms can also be used.

Copolyamides which are especially preferred include those which consist of amines of the dicycane type with dimerized fatty acids in a maximum total molar content of 12% based on a)+b)+c), i.e. with a maximum molar content of 24%, based on the total carboxyl groups; in particular, isophthalic acid is the main component of the aromatic acid.

The amorphous copolyamides according to the invention are rigid and transparent and have a glass transition temperature of between 115° C. and 210° C.; the glass transition temperature, due to moisture absorption, dropping only slightly during use, in contrast to the amorphous copolyamides of the prior art. The glass transition temperature can be varied by adjusting the ratio of dimerized fatty acid to aromatic dicarboxylic acid. If, for example, the copolyamide of the invention is produced from "Diamine" with dimerized fatty acid having a dimer content of at least 90% by weight plus isophthalic acid, the glass transition temperature, with a dimeric acid content of 25 mol %, is 115° C., with a dimeric acid content of 11.5 mol % it is 181° C., and with a dimeric acid content of only 6 mol % it is about 205° C.

As already mentioned, the outstanding property of the amorphous copolyamides according to the invention is the low moisture absorption, particularly under extreme conditions. For example, under exposure to boiling water, the glass transition temperature drops only slightly and the dimensional stability, transparency, and rigidity are substantially unchanged. Applications for which neither copolyamides nor polyamides could be used hitherto are therefore opened up for the copolyamides of the invention.

For example, a copolyamide of 50 mol % of "Diamine", 15 mol % of dimerized fatty acid, and 35 mol % of isophthalic acid absorbs only 0.7% by weight of water during conditioning at room temperature and relative humidity of 50%, the glass transition temperature falling from 158° C. to 151.5° C. Even after six day's storage in boiling water, the moisture content is only 3.1% and the glass transition temperature drops to 128° C.

The copolyamides according to the invention are also distinguished by high rigidity and impact resistance. If the notched bar impact resistance is not sufficient for special practical applications, it can be raised by addition of usual quantities of impact resistance modifiers which are common for polyamides. Such modifiers include core/shell polymers or olefinic elastomers grafted with maleic anhydride.

The copolyamides according to the invention are condensable to high molecular weights and can easily be discharged from the autoclaves used for their production. If no lactam is used as the additional monomer, there are only very slight residual quantities of extractable monomers, usually less than 1% by weight. Chain length regulation can easily be carried out by the intentional addition of monofunctionally acting compounds, e.g. monocarboxylic acids such as benzoic acid or acetic acid, or of monoamines such as cyclohexylamine or isotridecylamine.

Furthermore, the copolyamides according to the invention can be modified using conventional polyamide modifying agents and can be adapted thereby to particular applications. Sterically hindered phenols, for example, can be used as heat stabilizers, as well as phosphites or heat stabilizers of the copper/halogen type. Light stabilizers, for example hindered amines or oxazoline derivatives, or combinations of heat and light stabilizers, can be added to the copolyamides according to the invention. Coloring using soluble organic dyestuffs or pigments is possible. Further, stability to weathering can be improved, for example, by the addition of carbon black, optionally in combination with phenol or a copper halogen stabilizer.

Furthermore, the copolyamides according to the invention can also be reinforced by mineral fibers, glass fibers, or by the use of other inorganic or organic fiber in addition to the above-mentioned impact resistance modification. They can also be flame-retarded by the use of halogen compounds, red phosphorus, or dehydrating materials such as magnesium hydroxide. The addition of elastomers in order to increase the impact resistance in combination with the addition of a flameproofing agent, e.g. of the halogen type, is also possible.

The copolyamides according to the invention can readily be used for producing, preferably by injection molding, shaped articles which are distinguished by high rigidity and impact resistance, by high glass transition temperature and low moisture absorption, in particular for shaped articles having thin walls. They can also be processed by extrusion to form rigid pipes or cladding of, for example, optical waveguides. In the film area, they can be processed in combination with other polymers, for example by coextrusion.

The following examples illustrate, but do not limit the invention.

The production of the copolyamides according to the invention and the definition of their properties is first exemplified. The following measurements were taken:
1. Impact and notched-bar impact measurements according to Charpy, dry and conditioned DIN 53453
2. Tensile strength at yield, elongation at yield, tensile strength at break, elongation at break dry and conditioned DIN 53455
3. Tensile E modulus dry and conditioned DIN 53457
   Tensile testing machine: Elongation test equipment: "Zwick 1445" Manufacturer: Zwick, Ulm, Federal Republic of Germany
4. Water absorption
   at 50% relative humidity
   at 100% relative humidity
5. DSC-measurements:
   after 6 days' storage in water at 95° C.
   after attainment of the equilibrium water content at 50% relative humidity
   after attainment of the equilibrium water content at 100% relative humidity.

The DSC-measurements were carried out using the following device:
Type: 1091 B "Thermal Analyzer"
Manufacturer: Du Pont.
The samples were heated at 20° C./min.

To enable glass transition temperatures to be determined reproducibly in a moist state, the samples were poured into special steel pans which were tightly sealed.
Special pans
Type: "Large volume capsules"
Manufacturer: Perkin Elmer.
6. Relative viscosity as a 0.5% solution in m-cresol according to DIN 53727.

The copolyamides according to the invention can be produced in autoclaves which are conventional for polyamide production. The reaction mixture obtained can be worked up separately in a so-called dissolving vessel or directly in the autoclave. If a preliminary melt processing or dissolving vessel is provided, the neutralization reaction, i.e. salt formation, is preferably carried out there with addition of the necessary quantity of water. Heat is produced in the neutralization process and pressure builds up if the vessel is closed. If necessary, the heating can be carried out with stirring until a homogeneous, easily stirrable mixture is formed. The temperature of 160° C. to 180° C., at which the condensation reaction is initiated, should not be exceeded.

Processing and condensation of the melt takes place in an autoclave under an inert gas atmosphere, in particular with passage of nitrogen; steam can also completely or partially form the inert gas atmosphere, for example during the pressure phase.

The polycondensation reaction is preferably initiated under pressure. This reduces the undesirable loss of volatile monomer constituents in the initial stage of polymer synthesis. The melt can be heated slowly during the pressure phase; the pressure is generally released slowly and stepwise. Nitrogen is passed continuously over the melt when atmospheric pressure is reached; the condensation reaction, which can additionally be promoted by application of a vacuum, takes place simultaneously. The melt is stirred continuously during the pressure and the subsequent degassing steps.

A temperature of about 200° C. to 280° C. is maintained for the pressure phase while the pressure is simultaneously built up from 2 to 30 bar; a temperature of about 240° C. to 320° C. is maintained for degassing and polycondensation. A polymer of which the sum of all terminal groups is below 300 μeg/g of polymer is thereby obtained.

EXAMPLES

| | Diamine | Mol % | Dimerised fatty acid | Mol % | Aromatic dicarboxylic acid | Mol % |
|---|---|---|---|---|---|---|
| No. 1 | "Diamine" | 50 | "Dimeric acid 1" | 15.0 | IPS | 35.0 |
| No. 2 | "Diamine" | 50 | "Dimeric acid 2" | 15.0 | IPS | 17.5 |
| | | | | | TPS | 17.5 |
| No. 3 | "Diamine" | 50 | "Dimeric acid 1" | 11.5 | IPS | 38.5 |
| No. 4 | "Diamine" | 50 | "Dimeric acid 1" | 6.2 | IPS | 43.8 |

COMPARISON EXAMPLES

No. 5: Amorphous copolyamide based on "Diamine" and "Dimeric acid 1", corresponding to Example 6 of DE 17 20 832.0. Composition: 50 mol % "Diamine", 17 mol % "Dimeric acid 2", and 33 mol % sebacic. acid.

No. 6: Copolyamide based on "Diamine" and "Dimeric acid 1", corresponds to Example 7 of DE 17 20 832. Composition: 50 mol % "Diamine", 32 mol % "Dimeric acid 2", and 18 mol % dodecanedioic acid.

No. 7: According to Example 6 except that isophthalic acid is used in place of dodecanedioic acid.

No. 8: Copolyamide based on "Diamine" and "Dimeric acid 1", corresponding to Examples 8 of DE 17 20 832.
Composition: 50 mol % "Diamine", 18 mol % "Dimeric acid 2", and 32 mol % dedecanedioic acid.

No. 9: According to Example 8 except that isophthalic acid is used in place of dedecanedioic acid.

| Explanation of names: | |
|---|---|
| "Diamine" = | 3,3-dimethyl-4,4'-diaminodicyclohexylmethane |
| "Dimeric acid 1" = | (Pripol 1009/Unichema Internat.) mixture of dimerized fatty acids containing<br>Monomer < 0.1%<br>Dimer > 98.0%<br>Trimer < 1.0%<br>Others < 1.0% |
| "Dimeric acid 2" = | (Empol 1014/Henkel-Emery) mixture of dimerized fatty acids containing<br>Monomer about 4.0%<br>Dimer about 91.0%<br>Trimer about 5.0% |
| IPS = | Isophthalic acid |

| -continued |
|---|
| Explanation of names: |
| TPS = Terephthalic acid |

EXAMPLE 1

The following are introduced into the dissolving vessel a 130 liter autoclave and the neutralization and reaction carried out as set forth in the introductory portion of these Examples.

20,950 kg (87.88 mole) "Diamine"
14.690 kg (25.64 mole) "Dimeric acid 1"
9,995 kg (60.16 mole) isophthalic acid
5.0 kg water
0.020 kg antifoaming agent
Amine/acid ratio 1:1.024 including chain length regulator.

After the foregoing materials have been dissolved and the neutralization carried out, the reaction mixture is introduced into the reactor. During the 2 hour pressure phase, the mixture is heated to 240° C. and the pressure reduced from 10 to 2 bar. The pressure is then released slowly. The condensation temperature is raised stepwise to 295° C. in the 5 hours' degasification phase. The polymer is removed as a strand and was granulated.

Result:
relative solution viscosity: 1.430
terminal $NH_2$ groups: 83 μmole/g
COOH groups: 16 μmole/g
melt viscosity (122.6 N/270° C.): 4335 Pa
glass transition temperature: 158° C.

EXAMPLE 2

The following are introduced into the dissolving vessel a 32 liter autoclave.

3.160 kg (13.26 mole) "Diamine"
0.780 kg (4.70 mole) isophthalic acid
0.770 kg (4.63 mole) terephthalic acid
2.300 kg (4.01 mole) "Dimeric acid 2"
0.022 kg (0.14 mole) 1-amino-3-cyclohexylaminopropane
0.017 kg (0.10 mole) benzoic acid
0.5 kg water
0.005 kg antifoaming agent
Total amine/acid ratio: 1:1 (including chain length regulator).

The mixture is heated in the autoclave to 240° C. during the 2 hour pressure phase at 15 bar. After release of the pressure, the temperature is raised from 250° C. to 290° C. during the 3 hour degassing phase. The polymer is removed as a strand and granulated.

Result:
relative solution viscosity: 1.365
terminal $NH_2$ groups: 29 μmole/g
COOH groups: 117 μmole/g
melt viscosity (122.6N/270° C.): 603 Pa
glass transition temperature: 160° C.

EXAMPLE 3

The following are introduced into a 20 liter autoclave.

2.940 kg (12.33 mole) "Diamine"
1.590 kg (2.77 mole) "Dimeric acid 1"
1.550 kg (9.33 mole) isophthalic acid
0.030 kg (0.15 mole) tridecylamine
0.5 kg water
0.005 kg antifoaming agent
Total amine/acid ratio: 1:1.013 (including chain length regulator).

The mixture is heated in the autoclave to 250° C. during the 2 hour pressure phase at 10 bar. After release of the pressure, the temperature is raised from 250° C. to 295° C. during the 5 hour degassing phase. The polymer is removed as a strand and granulated.

Result:
relative solution viscosity: 1.325
terminal $NH_2$ groups: 82 μmole/g
COOH groups: 61 μmole/g
melt viscosity (122.6N/270° C.) 1800 Pa
glass transition temperature: 181° C.

EXAMPLE 4

The following are introduced into the dissolving vessel and then into a 20 liter autoclave.

3.205 kg (13.44 mole) "Diamine"
0.950 kg (1.66 mole) "Dimeric acid 1"
1.915 kg (11.53 mole) isophthalic acid
0.022 kg (0.14 mole) 1-amino-3-cyclohexylaminopropane
0.5 kg water
0.005 kg antifoaming agent
Total amine/acid ratio: 1:1.013 (including chain length regulator).

The mixture was heated in the autoclave to 250° C. during the 2 hour pressure phase at 10 bar. After releasing the pressure, the temperature was raised from 250° C. to 295° C. during the 5 hour degassing phase. The polymer was removed as a strand and was granulated.

Result:
relative solution viscosity: 1.338
terminal $NH_2$ groups: 46 μmole/g
COOH groups: 37 μmole/g
melt viscosity (122.6N/270° C.) 3717 Pa
glass transition temperature: 205° C.

TABLE 1

| | Analytical Values | | | |
|---|---|---|---|---|
| | Terminal $NH_2$ groups [μmole/g] | Terminal COOH groups [μmole/g] | Relative solution viscosity | Melt viscosity 270° C./122.6 N [Pa]S |
| Example | | | | |
| No. 1 | 83 | 16 | 1.430 | 4336 |
| No. 2 | 29 | 117 | 1.365 | 603 |
| No. 3 | 11 | 82 | 1.325 | 1800 |
| No. 4 | 46 | 37 | 1.338 | 3717 |
| Comparison examples | | | | |
| No. 5 | 17 | 33 | | |
| No. 6 | 151 | 199 | 1.214 | |
| No. 7 | 70 | 174 | 1.238 | |
| No. 8 | 62 | 143 | 1.292 | |

TABLE 1-continued

| | Analytical Values | | | |
|---|---|---|---|---|
| | Terminal NH$_2$ groups [μmole/g] | Terminal COOH groups [μmole/g] | Relative solution viscosity | Melt viscosity 270° C./122.6 N [Pa]S |
| No. 9 | 98 | 87 | 1.311 | |

The properties of the copolyamides produced are compiled in the following Tables 3 to 5.

TABLE 2 water absorption and glass transition temperatures
The Table shows the relationship between the water absorption and the change in the class transition temperature of copolyamides with different contents of dimeric acid, taking into consideration the ratio of CH$_2$ groups to CONH groups.

| Sample | Tg dry [°C.] | Tg after storage in water 6 days 95° C. [°C.] | Tg at equilibrium water-content Humidity 100% 23° C. [°C.] | Equilibrium water absorption Humidity 100% 23° C. [%] | Tg at equilibrium water-content Humidity 50% 23° C. [°C.] | Equilibrium water absorption Humidity 50% 23° C. [%] |
|---|---|---|---|---|---|---|
| No. 1 | 158 | 128 | 134 | 1.6 | 151.5 | 0.7 |
| No. 2 | 161 | 130 | 140.5 | 1.7 | 151 | 0.8 |
| No. 3 | 181 | 149 | 151 | 2.3 | 163 | 1.1 |
| No. 4 | 203 | 139 | 165 | 3.9 | 183 | 1.4 |
| Comparison example* | | | | | | |
| No. 5 | 114 | | | | | |
| No. 6 | 82 | | | | | |
| No. 7 | 98 | | | | | |
| No. 8 | 103 | | | | | |
| No. 9 | 131 | | | | | |

*All these products lose their form completely in boiling water.

TABLE 3

| | Mechanical properties | | | | | | | | | |
|---|---|---|---|---|---|---|---|---|---|---|
| Example | Tensile modulus dry [N/mm$^2$] | Tensile modulus condit. [N/mm$^2$] | Tensile strength at yield dry [N/mm$^2$] | Tensile strength at yield condit. [N/mm$^2$] | Elongation at yield dry [%] | Elongation at yield condit. [%] | Tensile strength at break dry [N/mm$^2$] | Tensile strength at break condit. [N/mm$^2$] | Elongation at break dry [%] | Elongation at break condit. [%] |
| No. 1 | 2130 | 1920 | 74 | 71 | 11 | 10 | 54 | 51 | 38 | 32 |
| No. 2 | 1930 | 1925 | 73 | 69 | 11 | 9 | 55 | 52 | 29 | 28 |
| No. 3 | 2190 | | | | | | 49 | | 4 | |
| No. 4 | 2260 | | | | | | 82.5 | | 18.3 | |

TABLE 4

| | mechanical properties | | | |
|---|---|---|---|---|
| Example | Impact Strength (notched bar) dry [kJ/m$^2$] | Impact Strength (notched bar) conditioned [kJ/m$^2$] | Impact strength dry [kJ/m$^2$] | Impact strength conditioned [kJ/m$^2$] |
| No. 1 | 4.0 | 3.5 | no breakage | no breakage |
| No. 2 | 1.4 | 2.4 | 80% no breakage | 80% no breakage |
| No. 3 | | | | |
| No. 4 | 0.7 | 0.6 | | 35.3 |

What we claim is:

1. An amorphous copolyamide of a monomer mixture consisting essentially of
   a) 50 mol % of at least one cycloaliphatic diamine of Formula I

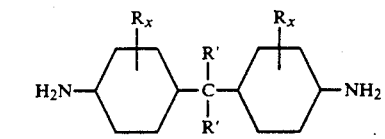

wherein R is an alkyl radical containing from 1 to 10 carbon atoms, R$^1$ is hydrogen or an alkyl radical containing 1 to 4 carbon atoms, and x is 0 to 4;
   b) 5 to 25 mol % of a dimerized fatty acid;
   c) 25 to 45 mol % of at least one aromatic dicarboxlic acid; and
   d) 0 to 50% by weight, based on the total amount of a), b), and c), of further polyamide-forming monomers.

2. The copolyamide of claim 1 wherein
   a) R is an alkyl radical containing from 1 to 2 carbon atoms, R' is hydrogen or an alkyl radical containing from 1 to 4 carbon atoms, and x is 1 or 2;
   b) comprises 5 to 12 mol % of said dimerized fatty acid, and c) comprises 38 to 45 mol % of said aromatic dicarboxylic acid, wherein the mole percent total 100%.

3. The copolyamide of claim 1 wherein said diamine is selected from the group consisting of
3,3'-dimethyl-4,4'diaminodicyclohexylmethane,
4,4'-diaminodicyclohexylmethane, and
4,4'-diaminodicyclohexylpropane.

4. The copolyamide of claim 1 wherein said fatty acid is a dimerized long-chain unsaturated acid.

5. The copolyamide of claim 4 wherein said unsaturated acid has at least 18 carbon atoms.

6. The copolyamide of claim 1 wherein said fatty acid has a dimer content of at least 90% by weight.

7. The copolyamide of claim 6 wherein said fatty acid has a dimer content of at least 97% by weight.

8. The copolyamide of claim 1 wherein said aromatic dicarboxylic acid is selected from the group consisting of isophthalic acid, terephthalic acid, and mixtures thereof.

9. The copolyamide of claim 8 wherein said dicarboxylic acid is isophthalic acid.

10. The copolyamide of claim 9 which contains at least 25 mol % of said isophthalic acid.

11. The copolyamide of claim 1 wherein said further polyamide-forming monomers are selected from the group consisting of aliphatic diamines containing 2 to 20 carbon atoms and aromatic/aliphatic diamines containing 6 to 12 carbon atoms reacted with aliphatic dicarboxylic acids containing 6 to 20 carbon atoms, and amino acids and lactams containing 4 to 14 carbon atoms.

12. The copolyamide of claim 1 wherein said polyamide-forming monomer is m-xylidenediamine.

13. The copolyamide of claim 1 wherein said aromatic dicarboxylic acid is selected from the group consisting of isophthalic acid, terephthalic acid, naphthalene dicarboxylic acid, t-butylisophthalic acid, 1,1,3-trimethyl-3-phenylindane-4',5-dicarboxylic acid, and mixtures thereof.

14. A process for the production of the copolyamides of claim 1 comprising precondensing said mixture in a first stage in a steam atmosphere at a precondensed pressure of 2 to 30 bar and a temperature of 200° to 280° C. to form a melt, releasing said pressure, condensing said melt in an inert atmosphere under a condensation pressure which does not exceed atmospheric pressure at 240° C. to 320° C. to produce a copolyamide comprising about 300 $\mu$eq terminal groups per gram of said copolymer.

* * * * *